United States Patent
Rychen

(10) Patent No.: US 8,245,316 B2
(45) Date of Patent: Aug. 14, 2012

(54) SCANNING PROBE MICROSCOPE WITH PERIODICALLY PHASE-SHIFTED AC EXCITATION

(75) Inventor: Jörg Rychen, Zurich (CH)

(73) Assignee: Specs Zürich GmbH, Zurich (CH)

( * ) Notice: Subject to any disclaimer, the term of this patent is extended or adjusted under 35 U.S.C. 154(b) by 110 days.

(21) Appl. No.: 12/518,417

(22) PCT Filed: Dec. 15, 2006

(86) PCT No.: PCT/CH2006/000703
§ 371 (c)(1),
(2), (4) Date: Oct. 5, 2009

(87) PCT Pub. No.: WO2008/071013
PCT Pub. Date: Jun. 19, 2008

(65) Prior Publication Data
US 2010/0031404 A1    Feb. 4, 2010

(51) Int. Cl.
*G01Q 20/00* (2010.01)
(52) U.S. Cl. .............. 850/5; 850/3; 850/10; 850/15; 850/33; 850/52; 850/60; 850/62
(58) Field of Classification Search .............. 850/3, 5, 850/10, 15, 33, 52, 60, 62
See application file for complete search history.

(56) References Cited

U.S. PATENT DOCUMENTS 5,466,935 A * 11/1995 Ray et al. .................. 850/4
5,557,156 A * 9/1996 Elings ................. 310/316.01
6,005,246 A 12/1999 Kitamura et al.
6,881,954 B1 * 4/2005 Morimoto et al. ............. 850/7
2009/0307809 A1 12/2009 Ziegler et al.

FOREIGN PATENT DOCUMENTS

| JP | 06308180 | 11/1994 |
|---|---|---|
| JP | 11-023588 | 1/1999 |
| JP | 2004294218 | 10/2004 |

(Continued)

OTHER PUBLICATIONS

Kobayahsi, N., Li, Y.J., Naitoh, Y., Kageshima, M., and Sugawara, Y., "High sensitivity force detection by Phase-modulation Atomic Force Microscopy" Japanese Journal of Applied Physics, vol. 45, pp. L793-L795, 2006.*

(Continued)

*Primary Examiner* — Jack Berman
*Assistant Examiner* — Meenakshi Sahu
(74) *Attorney, Agent, or Firm* — Marshall, Gerstein & Borun LLP

(57) ABSTRACT

The scanning probe microscope applies a sum of an AC voltage (Uac) and a DC voltage (Udc) to its probe. The frequency of the AC voltage (Uac) substantially corresponds to the mechanical oscillation frequency of the probe, but its phase in respect to the mechanical oscillation varies periodically. The phase modulation has a frequency fmod. The microscope measures the frequency (f) or the amplitude (K) of a master signal (S) applied to the probe's actuator, or it measures the phase of the mechanical oscillation of the cantilever in respect to the master signal (S). The spectral component at frequency fmod of the measured signal is fed to a feedback loop controller, which strives to keep it zero by adjusting the DC voltage (Udc), thereby keeping the DC voltage at the contact voltage potential.

11 Claims, 5 Drawing Sheets

FOREIGN PATENT DOCUMENTS

| | | |
|---|---|---|
| JP | 2006258536 | 9/2006 |
| JP | 2009544019 | 12/2009 |
| WO | WO 2008/006229 | 1/2008 |
| WO | WO 2008/071013 | 6/2008 |

OTHER PUBLICATIONS

Wu et al., "ac driving amplitude dependent systematic error in scanning Kelvin probe microscope measurements: Detection and correction," American Institute of Physics, 2006, 9 pages.

Translation of Japanese office action issued in corresponding JP application No. 2009-540565 mailed Sep. 27, 2011.

Andraka, "A survey of CORDIC algorithms for FPGA based computers", 1-10, Andraka Consulting Group, Inc., North Kingstown, RI (1998).

Chen et al., "Structures and Local Polarized Domains of Ferroelectric Organic Films Studied by Atomic Force Microscopy", *Japan J. Appl. Phys.*, 37:3834-3837 (1998).

Dunn et al., "Substrate effects on domain structures of PZT 30/70 sol-gel films via PiezoAFM", *Journal of the European Ceramic Society*, 22:825-833 (2002).

Fukuma et al., "Surface potential measurements by the dissipative force modulation method", *Review of Scientific Instruments*, 75:4589-4594 (2004).

Jacobs et al., "Practical aspects of Kelvin probe force microscopy", *Review of Scientific Instruments*, 70:1756-1760 (1999).

Jesse et al., "The band excitation method in scanning probe microscopy for rapid mapping of energy dissipation on the nanoscale", *Nanotechnology*, 18:1-8 (2007).

Kobayashi et al., "High-sensitivity force detection by phase-modulation atomic force microscopy," *Japan Soc. Appl. Phys Japan*, 45(29-32):L793-L795 (2006).

Nonnenmacher at al., "Kelvin probe force microscopy", *Appl. Phys. Lett.*, 58:2921-2923 (1991).

Takahashi at al., "Phase detection of electrostatic force by AFM with a conductive tip," *Ultramicroscopy Elsevier Netherlands*, 82(1-4): 63-68 (2000).

Wu et al., "AC driving amplitude dependent systematic error in scanning Kelvin probe microscope measurements: Detection and correction," *Review of Scientific Instruments, American Institute of Physics*, 77(4): 43711 (2006).

\* cited by examiner

SCANNING PROBE MICROSCOPE WITH PERIODICALLY PHASE-SHIFTED AC EXCITATION

TECHNICAL FIELD

The invention relates to a scanning probe microscope using a periodically phase-shifted AC excitation of its probe.

BACKGROUND ART

Scanning probe microscopes can be used to measure electrical properties of the surface of a sample with high spatial resolution. For example, the local charge, contact potential difference, electrical potential, dielectric constant and polarizability are of interest. Not only high spatial resolution, but also high resolution of the measured quantity is desired.

Generally the term "Kelvin Probe Microscopy" (KPM) is used when the local contact potential is measured. The terms "Kelvin Probe Force Microscopy" (KPFM) or "Kelvin Force Probe Microscopy" are more specific since they indicate that the Kelvin principle works by detecting the force between the two oscillating capacitor electrodes.

T. Fukuma et al. in Rev. Sci. Instrum., Vol. 75, No. 11, pp. 4589-4594 describe a scanning probe microscope having a probe on a cantilever, an oscillator generating a master signal, and an actuator driven by the master signal and applying a mechanical force to the cantilever. The deflection of the cantilever is measured by a detector assembly generating an observed signal depending on the amplitude of the deflection. In addition to this, a DC voltage source and an AC voltage source are provided for applying a DC voltage and an AC voltage between the probe and the sample. In operation, the DC voltage is adjusted to compensate any electrostatic field between tip and sample. In this case the ac force at the same frequency as the ac voltage goes to zero. This allows determining electrical properties of the sample such as contact potential, electronic potential, or local charges.

DISCLOSURE OF THE INVENTION

It is an object of the present invention to provide a microscope and a method for operating the same that allows to measure electrical properties of the surface accurately. This object is achieved by the device and method of the independent claims.

Accordingly, a phase modulator is provided for generating a periodic modulation of the phase of the AC voltage in respect to the master signal. The modulation has a frequency fmod. In addition to this, a voltage control loop is provided, which measures a spectral component of the observed signal at the frequency fmod and strives to keep the spectral component zero by varying the DC voltage.

When the voltage control loop succeeds to set the spectral component at fmod to zero, the system is in a state where the contact potential of the sample is compensated by the DC voltage, i.e. where the (linear) electrostatic excitation of the probe due to Uac vanishes. This allows to distinguish between the electrostatic interactions between probe and sample and other tip sample interactions, such as magnetic forces, capillary forces, etc.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Definitions:

Before turning to the description of specific embodiments, the following terms used in the description and claims are defined explicitly:

The term "free resonance" of the mechanical resonator (cantilever) designates a resonance of the mechanical resonator (cantilever) when operating the same at a large distance from the sample, i.e. at a distance where electrostatic interactions between the probe and a sample are negligible.

The terms "electrostatic force" or "electrostatic interaction" refer to the force generated by the applied DC and AC voltages between the probe and the sample. This force or interaction may have an AC component.

EMBODIMENT 1

Figure 1:
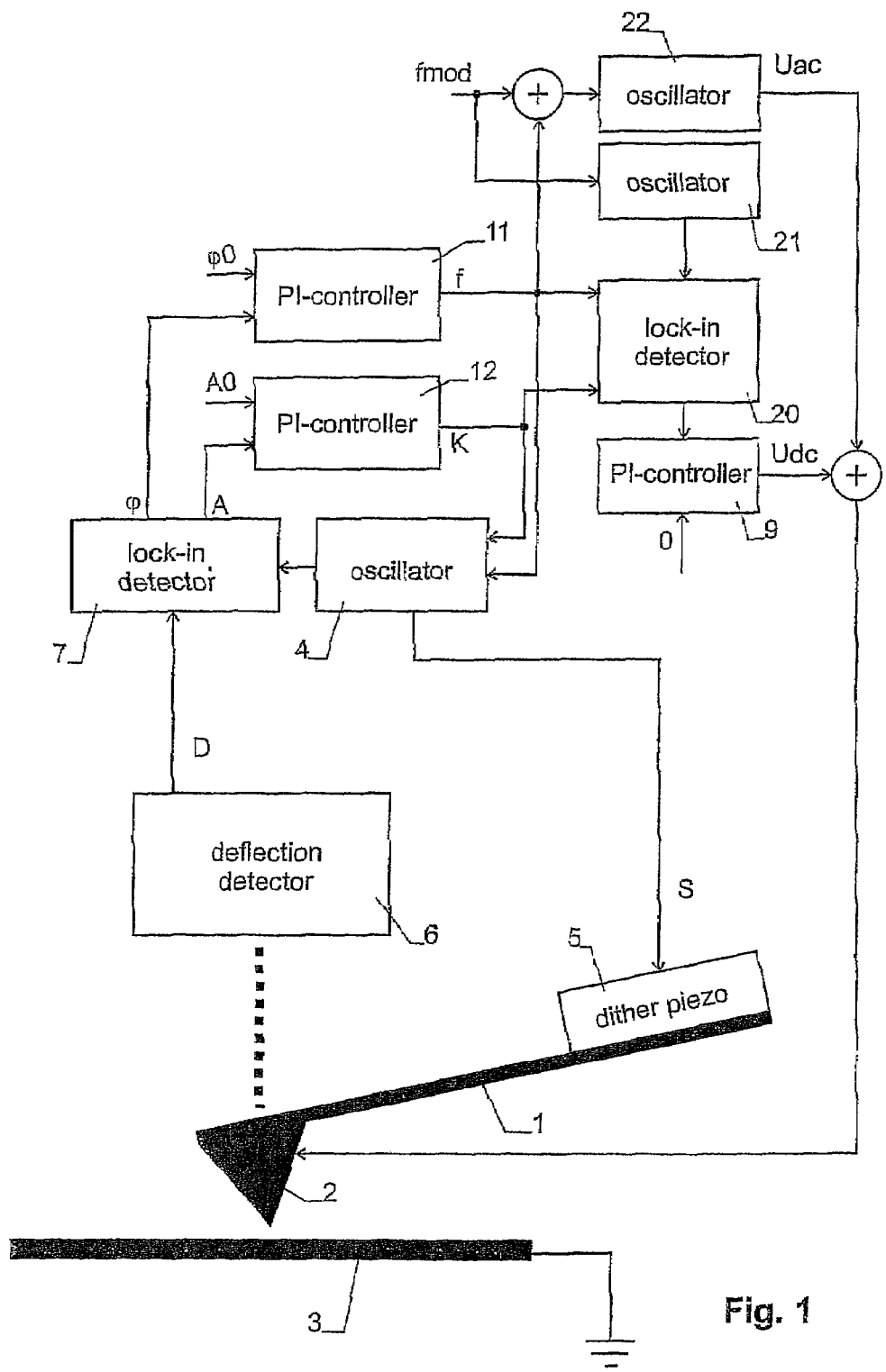
FIG. 1 shows a first embodiment of the invention.

FIG. 1 shows a scanning probe microscope having a flexible cantilever 1 and a probe 2 with a fine tip, which are moved along the surface of a sample 3. Cantilever 1 is the mechanical resonator of the microscope.

The scanning probe microscope is provided with suitable means for adjusting the x-, y- and z-position of probe 2 in respect to sample 3. These means, which are not shown in any of the figures, can be implemented in various manners known to the person skilled in the art. Especially the invention allows to simultaneously track the topography of the sample by known methods of scanning force microscopy. For example one mechanical resonance of the cantilever is used for tracking of the topography, where another mechanical resonance is used for the operation of the electrostatic measurements according to this invention.

The components shown in the figures represent the parts of the microscope that allow measuring an electrical property of sample 3, for example the local contact potential difference between probe 2 and sample 3. They comprise an oscillator 4 generating a master signal S at a frequency f. Master signal S drives a dither piezo 5, which acts as an actuator applying a mechanical force to cantilever 1. Frequency f is advantageously chosen such that cantilever 1 is excited at or close to one of its resonance frequencies.

The oscillatory deflection of cantilever 1 is measured by a deflection detector 6 and a lock-in detector 7. The raw signal D measured by deflection detector 6 is, in the embodiments shown here, assumed to be proportional to and in phase with the present deflection position of the cantilever. (If raw signal D is phase shifted in respect to this deflection, appropriate phase correction is required in the other parts of the signals as known to the person skilled in the art).

The frequency and amplitude of the master signal are controlled by a first and a second primary control loop.

The first primary control loop comprises a first PI-controller 11 comparing the phase φ from lock-in amplifier 7 with a phase setpoint φ0 and controlling the frequency f of oscillator 4 for keeping phase φ equal to phase setpoint φ0. For this purpose, the output signal f of PI-controller 11 is fed a frequency control input of oscillator 4.

The second primary control loop comprises a second PI-controller 12 comparing the amplitude A from lock-in amplifier 7 with an amplitude setpoint A0 and controlling the amplitude of master signal S for keeping amplitude A equal to amplitude setpoint A0. For this purpose, the output signal K of PI-controller 12 is fed an amplitude control input of oscillator 4.

The embodiment of FIG. 1 further comprises a voltage control loop based on a PI-controller 9, which generates a DC voltage Udc, which is added to an AC voltage Uac and applied to probe 2. Sample 3 is grounded such that the voltage between probe 2 and sample 3 equals Uac+Udc.

The input signal to PI-controller 9 is generated by a lock-in detector 20 that measures, in the present embodiment, the output of PI-controller 11 (corresponding to the frequency f of the master signal) and the output of PI-controller 12 (corresponding to the amplitude K of the master signal).

Lock-in detector 20 measures at the frequency and in respect to the phase of the output signal of an oscillator 21. Oscillator 21 oscillates at a given frequency fmod, which is typically much smaller than frequency f of the master signal (fmod is e.g. 0-2 kHz while f is e.g. 10 kHz-5 MHz).

A further oscillator 22 oscillates at the frequency f+fmod with fmod<<f, i.e. substantially at frequency f with a saw-tooth phase shift, and generates AC voltage Uac. Its oscillation frequency is controlled by the output of an adder adding the frequencies f and fmod. This leads to a periodic variation of the phase shift of the master signal S and the Ac-voltage Uac. (Due to wrapping of the phase (modulus 360 deg) a sawtooth-like function of the phase shift results). The frequency of the periodic phase modulation is thus fmod.

It must be noted that both primary control loops (formed by the PI-controllers 11 and 12) have a response time faster than the period 1/fmod and thus can follow the periodic changes of the condition between probe and sample at frequency fmod. The voltage control loop 9 has a response time slower than 1/fmod since it has to react on a demodulated signal resulting from a lock-in operated with fmod.

The operation of the device of FIG. 1 is as follows:

In first step, suitable setpoints $\phi 0$ and A0 for the PI-controllers 11 and 12 are determined. Advantageously, phase setpoint $\phi 0$ is set to a phase shift of the deflection oscillation when operating cantilever 2 at a free resonance, i.e. at a resonance in the absence of electrostatic forces. Setpoint $\phi 0$ can e.g. be found by removing probe 2 far from sample 3 or by applying a voltage corresponding to the contact potential difference to it and then adjusting frequency f until amplitude A is at a maximum, in which case phase $\phi$ will be equal to the desired setpoint $\phi 0$. A0 is set to the desired amplitude A.

In operation, probe 2 is moved along sample 3 while recording DC voltage Udc. When the contact potential between probe 2 and sample 3 changes, the AC voltage Uac leads to a force at frequency f+fmod. Since fmod<<f, the force generated by Uac can be considered to be at the frequency f of master signal S but with periodically changing phase shift $\phi ac$ in respect to master signal S. Depending on the phase shift $\phi ac$, the electrostatic excitation can act as a conservative force (in case the phase shift is 0 or 180 deg) or as a dissipative force (in case the phase shift is 90 or 270 deg). Conservative forces will cause a frequency shift of the oscillation of the mechanical oscillator and dissipative forces will cause an enhanced or reduced Q-factor of the mechanically oscillating system.

Since phase shift $\phi ac$ (or, rather, its 360° modulus: $\phi ac$ mod 360°) varies in a saw-tooth pattern with frequency fmod, the phase shift, frequency and amplitude of master signal S varies with the same frequency.

Therefore, if the primary control loop is designed to have a response time faster than 1/fmod, the output signals of PI-controllers 11 and 12 (which correspond to the frequency f and the amplitude K of master signal S) will have a spectral component at frequency fmod, which is detected by lock-in detector 20, causing PI-controller 9 to vary the voltage Udc until it compensates the contact potential and the output signal of lock-in detector 20 goes to zero.

In the embodiment of FIG. 1, lock-in detector 20 has two input channels, one for frequency f, and the other for amplitude K, both together representing a complex signal that is demodulated by the (complex) lock-in technique. The output of lock-in detector 20 represents the amplitude at the frequency fmod of the complex input signal.

As mentioned, if Udc does not compensate the electrostatic force, the frequency f as well as amplitude K have a non-zero spectral component at frequency fmod. Therefore, lock-in detector 20 can also be designed to measure one of these signals only.

Digital Implementation of Embodiment 2

Figure 2:
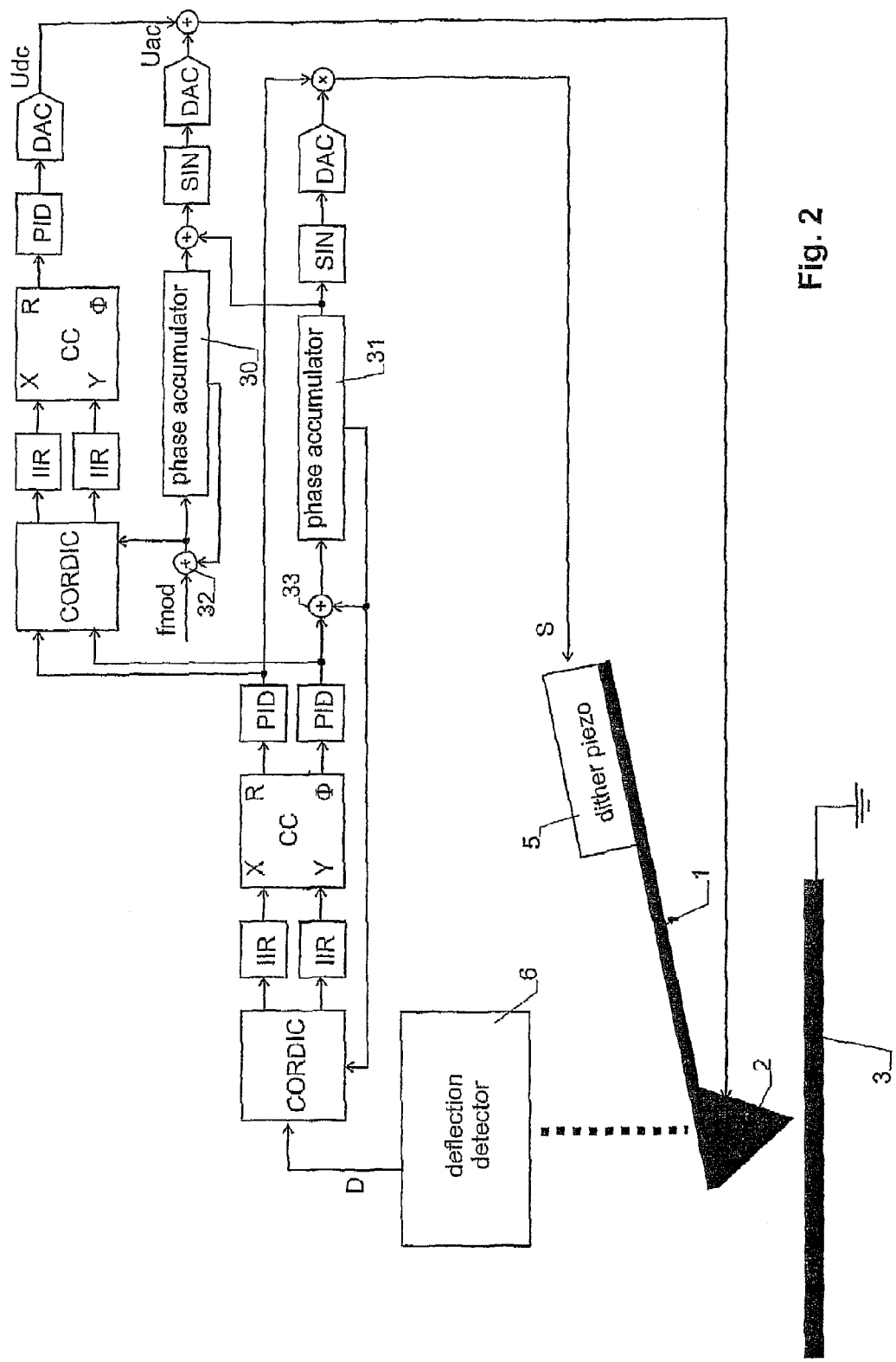
FIG. 2 shows a FPGA implementation of the first embodiment.

FIG. 2 shows an implementation of the embodiment of FIG. 1 as a Field Programmable Gate Array (FPGA). In the figure, the following abbreviations are used:

CORDIC: COordinate Rotation Digital Computer. Such a unit implements an algorithm that can be used for rotating a vector. It has two inputs (x, y) describing the input vector, an input phi indicating the angle of rotation, and two outputs describing the rotated vector.

CC: Coordinate Converter, a unit converting Cartesian coordinates into polar coordinates. This functionality can e.g. be implemented by means of a CORDIC.

PID: Proportional, Integral and Differential controller.

SIN: A lookup table for sine (or cosine) values for generating a sine (or cosine) waveform from a series of consecutive integer numbers.

DAC: digital analog converter.

The two phase accumulators are registers that are incremented by a given value in each cycle, the value representing the frequency. The accumulator wraps when it overflows. The value from each accumulator is fed to a SIN lookup table for generating the signals S and Uac.

IIR: Inifinite impulse response filter. A digital low-pass filter that is easy to implement.

EMBODIMENT 2

Figure 3:
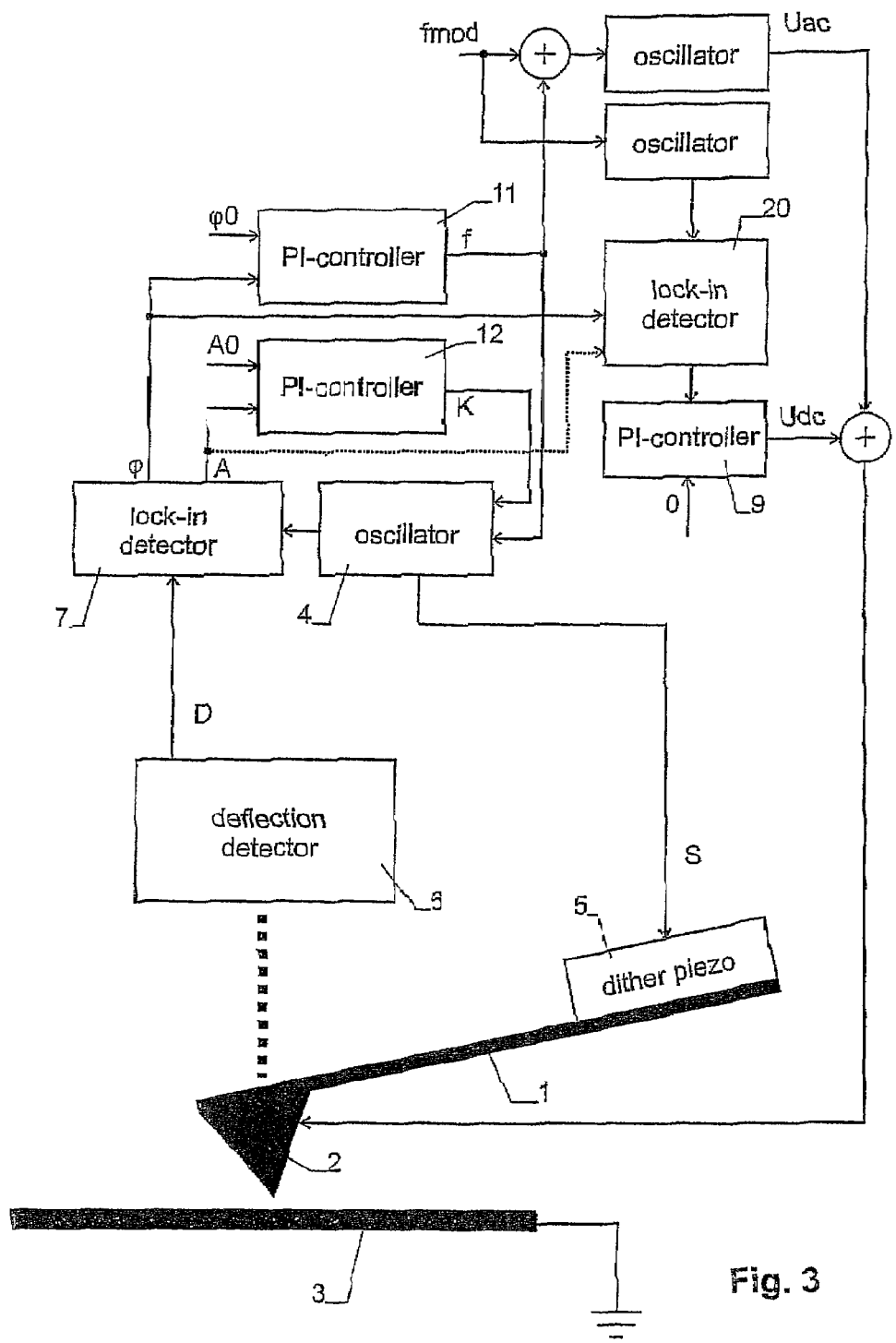
FIG. 3 shows a second embodiment of the invention.

The second embodiment of the invention is shown in FIG. 3 and corresponds to the one of FIG. 1 with the exception that the primary control loop is designed to have a response time slower than 1/fmod, for which reason the input signals of lock-in detector 20 are the phase $\phi$ and the amplitude A of the raw signal D (i.e. of the mechanical deflection of cantilever 1) as measured by lock-in detector 7.

Also, as indicated by a dotted line between lock-in detector 20 and output A of lock-in detector 7, lock-in detector 20 can measure phase $\phi$ of the raw signal D only.

EMBODIMENT 3

Figure 4:
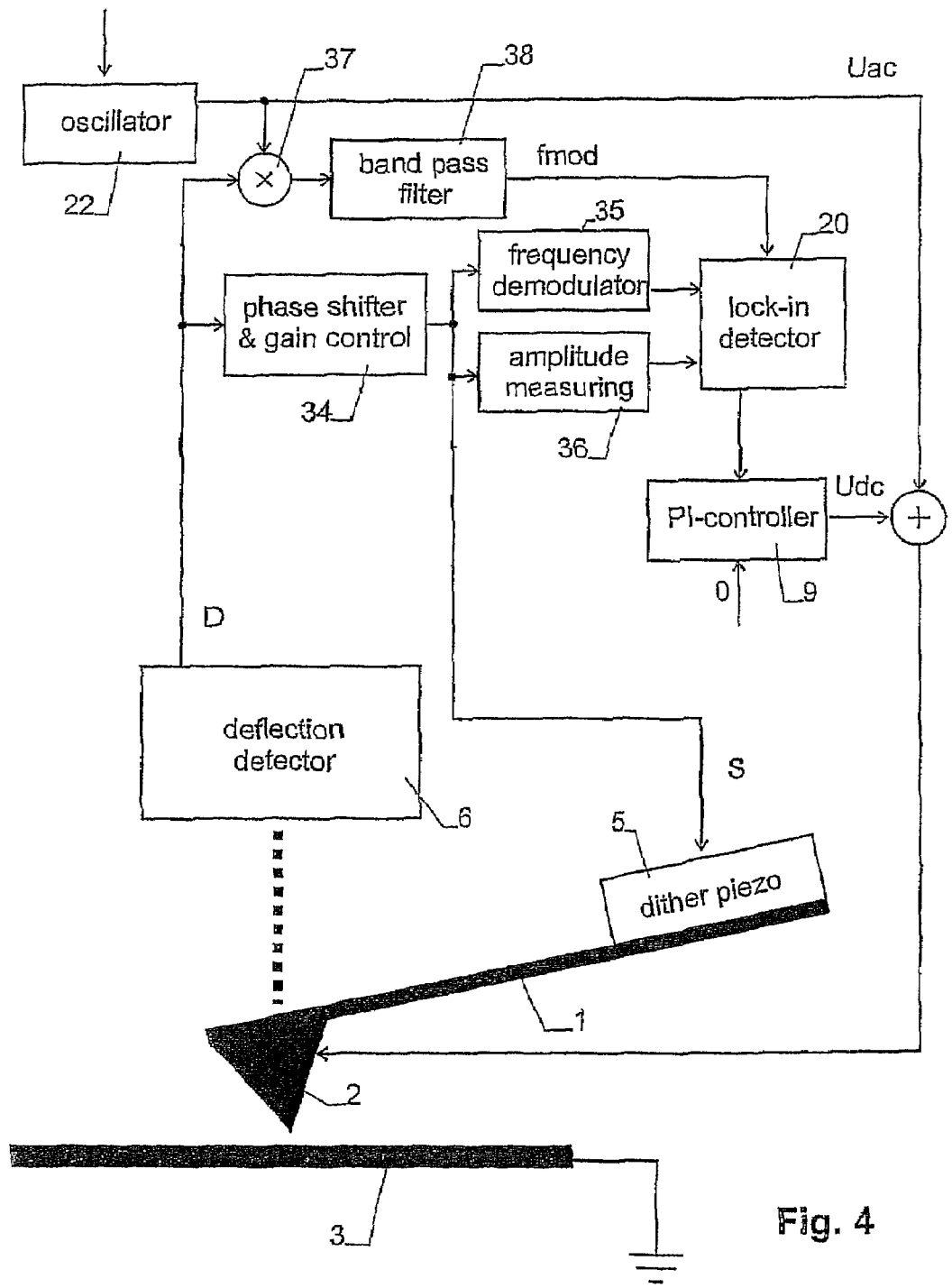
FIG. 4 shows a third embodiment of the invention and
FIG. 5 shows a fourth embodiment of the invention.

The embodiment of FIG. 4 differs from the one in FIG. 1 in that the two primary control loops have been replaced by a self-excitatory loop comprising a phase shifter & gain control 34 that directly feeds a gain-controlled and phase-shifted version of the raw signal D back to dither piezo 5. The phase shift introduced by phase shifter & gain control 34 is such that cantilever 1 is excited at one of its resonance frequency. Hence, in this embodiment, the oscillator for generating the primary signal S is formed by the closed loop of deflection detector 6, phase shifter & gain control 34, dither piezo 5 and cantilever 1.

A frequency counter or demodulator 35 feeds the frequency f of the master signal S to the first input of lock-in detector 20. Similarly, an amplitude measuring unit 36 feeds the amplitude K of master signal S to the second input of lock-in detector 20. The output signal of lock-in detector 20 is again fed to PI-controller 9, which controls voltage Udc such that the output signal from lock-in detector 20 is restored to 0.

The reference input for lock-in detector 20 is fmod, which is the difference frequency of the electrostatic excitation voltage Uac and the oscillation of raw signal D. Since fmod is again much smaller than f, Uac can again be considered to oscillate at frequency f but with a phase shift that changes periodically with frequency fmod. Frequency fmod is deduced by mixing (multiplying) voltage Uac and raw signal D in a multiplier 37 and low pass filtering the product. Hence, multiplier 37 and low pass filter 38 from a difference frequency generator generating a signal at a frequency equal to the difference of the frequencies of raw signal D and AC voltage Uac.

Oscillator 22 generating voltage Uac has a fixed frequency that is slightly different (e.g by 2 kHz) from the natural resonance frequency of cantilever 1.

EMBODIMENT 4

Figure 5:
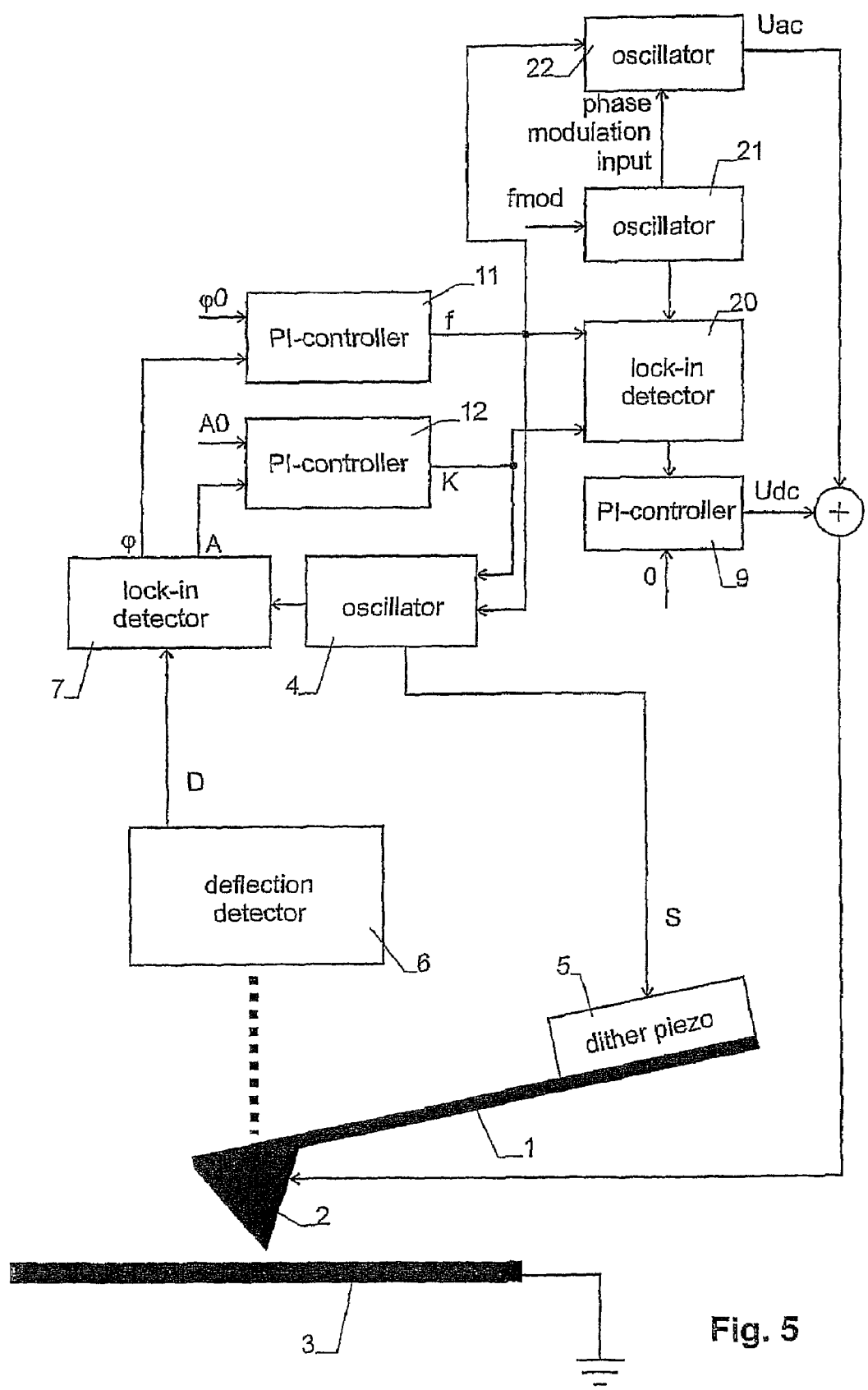

The embodiment of FIG. 5 differs from the one of FIG. 1 in that oscillator 22 operates at frequency f but comprises an additional phase modulation input, which allows to vary the phase of voltage Uac (with respect to master signal S, generated by oscillator 4 at the same frequency f). The signal applied to the phase modulation input is the signal generated by oscillator 21, which oscillates at frequency fmod. The depth of the phase modulation can e.g. be set to +/−45° maximally. If the non-phase-modulated voltage Uac has a phase relative to the mechanical oscillation (signal D) of 0°, it would cause a conservative effect on the mechanical oscillator. The phase modulation, however, will primarily cause the dissipative effect to oscillate at frequency fmod. Thus, the amplitude controller will react and fmod will appear in the excitation signal, i.e. in the signal K. From there it can be detected by the lock-in detector 20. Controller 9 can now adjust voltage Udc so that the output of lock-in detector 20 goes back to zero. If, on the other hand, the (non-phase-modulated) unmodulated voltage Uac is 90° with respect to the oscillation of the cantilever, it will cause a dissipative effect. The phase modulation will then primarily cause the conservative effects to oscillate. Thus, the phase controller will react and fmod will appear in the signal f, where it is again detected by lock-in detector 20 and compensated for by controller 9.

GENERAL COMMENTS

In all of the above examples, at least one of the following signals is used in the voltage control loop:
- the frequency f of the master signal, and/or
- the amplitude K of the master signal, and/or
- the phase shift φ of the deflection in respect to the master signal.

In the claims, the measured signal or signals is/are called the observed signal/signals. The observed signal/signals can also be a quantity derived from any of the above three signals or a complex signal composed from two of these signals.

Lock-in detector 20 measures the spectral component of the observed signal/signals at the frequency fmod, and controller 9 adjusts DC voltage Udc to keep the spectral component zero.

All of the above embodiments further comprise a phase modulator for generating a periodic modulation of the phase of AC voltage Uac in respect to master signal S, the periodic modulation having the frequency fmod<<f. In the embodiment of FIGS. 1 and 3, the phase modulator is formed by the adder adding frequency signals f and fmod, and the phase modulation (mod 360°) will follow a sawtooth pattern. In the embodiment of FIG. 4, the phase modulator is implicitly formed by oscillator 22, which operates at a frequency slightly different from the eigenfrequency of cantilever 1, the difference in frequencies corresponding to fmod. In the embodiment of FIG. 5, the phase modulator is formed by oscillator 21 driving the phase modulation input of oscillator 22.

In all embodiments, the resulting phase modulation in AC voltage Uac is invisible in the observed signal/signals if DC voltage Udc corresponds to the contact voltage potential. If not, controller 9 modifies DC voltage Udc to make it again equal to the contact voltage potential.

It is clear from the above that the present invention can be carried out in various different embodiments, some of which are depicted in FIGS. 1 to 5. It must be noted, though, that further designs are possible.

Even though PI-controllers have been used for the various feedback loops of the shown embodiments, the person skilled in the art will recognize that these can be replaced by controllers with other properties, such as PID controllers. Also, the various feedback loops and other components of the system can at least be implemented in hard- or software or combinations of hard- and software, as well as in analog or digital circuitry.

Actuator 5 may use a magnetic interaction for applying a force to cantilever 2 instead of using the piezo-effect, or any other suitable means for applying a mechanical force to cantilever 2 can be used.

As mentioned above, the scanning probe microscope is equipped with suitable means for adjusting the x-, y- and z-position of probe 2 in respect to sample 3. The z-position of the probe can e.g. by controlled by exciting cantilever 1 at another resonance than the resonance used for the measurements mentioned above. Typically, the first resonance (lowest eigenfrequency) of cantilever 1 is used for z-position control while a higher resonance is used for the frequency f mentioned above. The z-position control can e.g. be achieved by exciting cantilever 1 at its lowest eigenfrequency (using a further oscillator) and monitoring the amplitude of the cantilever deflection while approaching probe 2 to sample 3. When probe 2 starts to interact with sample 3, the amplitude will be reduced. The reduction of the amplitude to about 80% of the free oscillation is used as a setpoint for controlling the tip-sample displacement. This method is known to the person skilled in the art under the names of "Tapping Mode", "AM control" or "slope detection". Many other schemes are used for probe-sample control. For example, in the "nc-afm" mode the frequency shift of the oscillation is used for probe-sample control.

In the above embodiments, the mechanical resonator was formed by a cantilever. The person skilled in the art knows various alternatives to cantilevers, such as membranes or other elastically deflectable structures.

While there are shown and described presently preferred embodiments of the invention, it is to be distinctly understood that the invention is not limited thereto but may be otherwise variously embodied and practiced within the scope of the following claims.

The invention claimed is:

1. A scanning probe microscope for measuring properties of a sample comprising:
    a probe on a mechanical resonator,
    an oscillator generating a master signal (S),
    an actuator driven by said master signal (S) and applying a mechanical force to said mechanical resonator at a frequency f,
    a DC voltage source applying a DC voltage (Udc) to said probe,
    an AC voltage source applying an AC voltage (Uac) substantially at said frequency f to said probe,
    a detector assembly measuring at least one observed signal depending on the frequency (f) of the master signal, the amplitude (K) of the master signal, and/or a phase shift (φ) of said deflection in respect to the master signal (S),
    said scanning probe microscope further comprising a phase modulator for generating a periodic modulation of a phase shift of said AC voltage in respect to said master signal, said periodic modulation of the phase shift having a frequency fmod,
    a voltage control loop measuring a spectral component of said observed signal at said frequency fmod and controlling said DC voltage (Udc) to keep said spectral component zero.

2. The scanning probe microscope of claim 1 further comprising a primary control loop controlling, said actuator and having a phase setpoint (φO) and/or amplitude setpoint (AO) for the phase and/or amplitude, respectively, of said deflection and controlling the frequency (f) and/or an amplitude (K), respectively, of said master signal (S) for keeping the phase and/or amplitude, respectively, of said deflection at said phase setpoint (φO) and/or amplitude setpoint (AO).

3. The scanning probe microscope of claim 2 further comprising an oscillator for generating said AC voltage (Uac), wherein said oscillator operates at a frequency f+fmod.

4. The scanning probe microscope of claim 2 further comprising an oscillator for generating said AC voltage (Uac), wherein said oscillator operates at a frequency f and has a phase modulation input for modulating the phase shift of said AC voltage (Uac) with a signal varying at the frequency fmod applied to said modulation input.

5. The scanning probe microscope of claim 1 further comprising a lock-in detector for measuring the phase (φ) of said deflection in respect to said master signal (S) and/or for measuring the amplitude (A) of said deflection at the frequency of said master signal.

6. The scanning probe microscope of claim 1 further comprising a feedback loop feeding a signal (ID) derived from said deflection back to said actuator, thereby forming a self-excitatory loop.

7. The scanning probe microscope of claim 6 comprising a difference frequency generator determining the frequency fmod.

8. The scanning probe microscope of claim 1 further comprising an oscillator operating at a fixed frequency and generating said AC voltage (Uac).

9. The scanning probe microscope of claim 1 wherein said detector assembly comprises a lock-in amplifier operating at said frequency fmod.

10. The scanning probe microscope of claim 1 wherein fmod<<f.

11. The scanning probe microscope of claim 1 further comprising a driver controlling said actuator and being adapted to keep a phase and or an amplitude of said deflection constant.

* * * * *

UNITED STATES PATENT AND TRADEMARK OFFICE
CERTIFICATE OF CORRECTION

PATENT NO.        : 8,245,316 B2
APPLICATION NO.   : 12/518417
DATED             : August 14, 2012
INVENTOR(S)       : Rychen Page 1 of 1

It is certified that error appears in the above-identified patent and that said Letters Patent is hereby corrected as shown below:

In the Claims

Column 7, Line 37, Claim 2, delete "controlling," and insert -- controlling --, therefor.

Column 8, Line 20, Claim 6, delete "(ID)" and insert -- (D) --, therefor.

Column 8, Line 36, Claim 11, delete "and or" and insert -- and/or --, therefor.

Signed and Sealed this
Ninth Day of September, 2014

Michelle K. Lee
*Deputy Director of the United States Patent and Trademark Office*